US009063918B2

(12) United States Patent
Jacobs et al.

(10) Patent No.: US 9,063,918 B2
(45) Date of Patent: Jun. 23, 2015

(54) DETERMINING A VIRTUAL INTERRUPT SOURCE NUMBER FROM A PHYSICAL INTERRUPT SOURCE NUMBER

(71) Applicant: International Business Machines Corporation, Armonk, NY (US)

(72) Inventors: Stuart Z. Jacobs, Lakeville, MN (US); David A. Larson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 13/768,574

(22) Filed: Feb. 15, 2013

(65) Prior Publication Data

US 2014/0237151 A1    Aug. 21, 2014

(51) Int. Cl.
*G06F 13/24*    (2006.01)
*G06F 9/50*    (2006.01)

(52) U.S. Cl.
CPC .............. *G06F 13/24* (2013.01); *G06F 9/5005* (2013.01)

(58) Field of Classification Search
CPC .......... G06F 13/24; G06F 9/50; G06F 9/5005
USPC ............................. 710/260, 267, 268; 718/1
See application file for complete search history.

(56) References Cited

U.S. PATENT DOCUMENTS

| 6,219,743 | B1 * | 4/2001 | Kennel et al. ................. 710/260 |
| 6,272,585 | B1 | 8/2001 | Roobrouck et al. |
| 6,738,386 | B1 | 5/2004 | Holmqvist |
| 7,533,207 | B2 | 5/2009 | Traut et al. |
| 8,291,135 | B2 | 10/2012 | Subramanian et al. |
| 2010/0023666 | A1 * | 1/2010 | Mansell et al. ............... 710/267 |

* cited by examiner

*Primary Examiner* — Tim T Vo
*Assistant Examiner* — Phong H Dang
(74) *Attorney, Agent, or Firm* — Owen J. Gamon

(57) ABSTRACT

In an embodiment, a request is received from a virtual machine that specifies a virtual ISN and a hardware resource. A physical ISN is selected that is assigned to the hardware resource. The physical ISN is assigned to the virtual ISN as an assigned pair. The request and the physical ISN are sent to the hardware resource. A physical interrupt is received from the hardware resource that specifies the physical ISN. In response to the receipt of the physical interrupt that specifies the physical ISN, the virtual machine and the virtual ISN that is assigned to the first physical ISN are determined from the physical interrupt and the assigned pair from among a plurality of virtual machines. In response to determining the virtual machine and first virtual ISN that is assigned to the physical ISN, a virtual interrupt that comprises that virtual ISN is sent to the virtual machine.

20 Claims, 7 Drawing Sheets

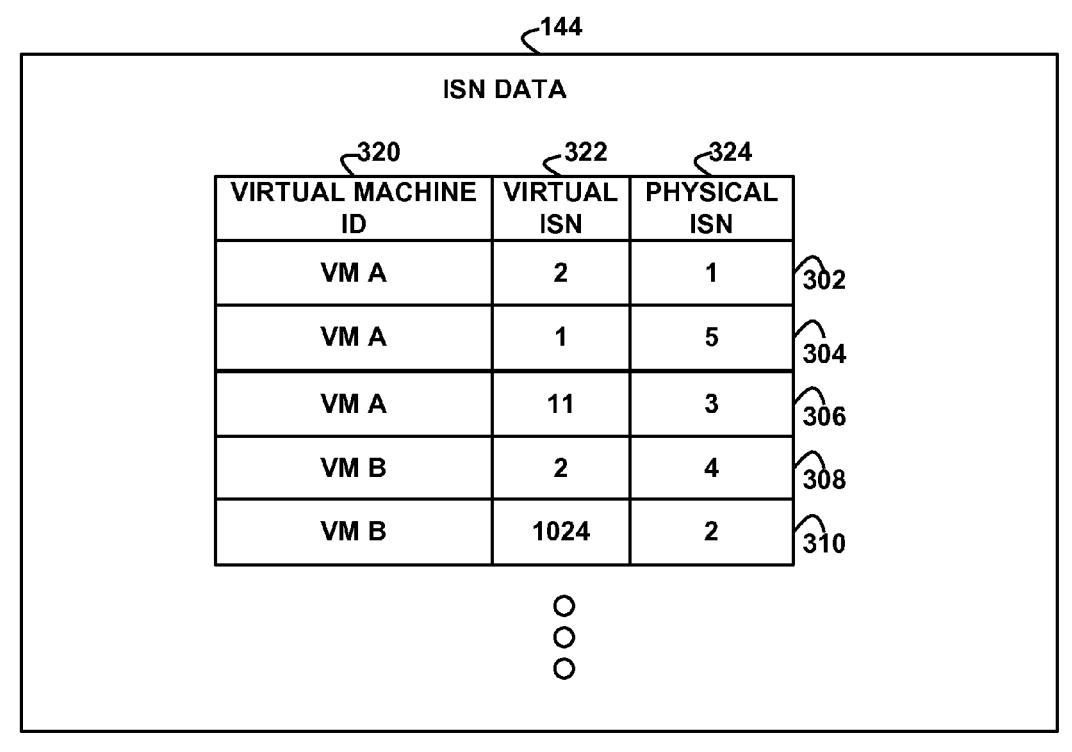

┌─144
                                              ISN DATA
                      ┌─320        ┌─322        ┌─324
                  | VIRTUAL MACHINE ID | VIRTUAL ISN | PHYSICAL ISN |
                  |---|---|---|
                  | VM A | 2 | 1 |  ─302
                  | VM A | 1 | 5 |  ─304
                  | VM A | 11 | 3 | ─306
                  | VM B | 2 | 4 |  ─308
                  | VM B | 1024 | 2 | ─310

FIG. 3

DETERMINING A VIRTUAL INTERRUPT SOURCE NUMBER FROM A PHYSICAL INTERRUPT SOURCE NUMBER

FIELD

An embodiment of the invention generally relates to computer systems and more particularly to sending requests to shared resources and sending completion interrupts to virtual machines.

BACKGROUND

Computer systems typically comprise a combination of computer programs and hardware, such as semiconductors, transistors, chips, circuit boards, cards, storage devices, and processors, which are referred to as resources. The computer programs are stored in the storage devices and are executed by the processors.

Some computer systems support parallel processing. From a hardware standpoint, computers increasingly rely on multiple microprocessors to provide increased workload capacity. From a program standpoint, multithreaded operating systems and kernels have been developed, which permit computer programs to concurrently execute in multiple threads, so that multiple tasks can essentially be performed at the same time. In addition, some computers implement the concepts of virtual machines or logical partitioning, where a single physical computer operates essentially like multiple and independent virtual computers, referred to as virtual machines or logical partitions, with the various resources in the physical computer (e.g., processors, memory, adapters, and input/output devices) allocated among the various virtual machines via a partition manager, or hypervisor. Each virtual machine may execute a separate operating system, and from the perspective of users and of the programs executing in the virtual machine, operates as a fully independent computer. Each virtual machine essentially competes with other virtual machines for the limited resources of the computer, and the needs of each virtual machine may change over time, so that the virtual machines may share the limited resources of the computer system.

SUMMARY

A method, computer-readable storage medium, and computer system are provided. In an embodiment, a request is received from a virtual machine that specifies a first virtual interrupt source number and a first hardware resource. A first physical interrupt source number is selected that is assigned to the first hardware resource. The first physical interrupt source number is assigned to the first virtual interrupt source number as an assigned pair that comprises the first physical interrupt source number and the first virtual interrupt source number. The assigned pair is saved. The request and the first physical interrupt source number are sent to the first hardware resource. A physical interrupt is received from the first hardware resource that specifies the first physical interrupt source number. In response to the receipt of the physical interrupt that specifies the first physical interrupt source number, the virtual machine and the first virtual interrupt source number that is assigned to the first physical interrupt source number are determined from the physical interrupt and the assigned pair from among a plurality of virtual machines. In response to determining the virtual machine and the first virtual interrupt source number that is assigned to the first physical interrupt source number, a virtual interrupt that comprises that first virtual interrupt source number is sent to the virtual machine.

BRIEF DESCRIPTION OF THE SEVERAL VIEWS OF THE DRAWINGS

FIG. 3 depicts a block diagram of interrupt source number data, according to an embodiment of the invention.

It is to be noted, however, that the appended drawings illustrate only example embodiments of the invention, and are therefore not considered a limitation of the scope of other embodiments of the invention.

DETAILED DESCRIPTION

Figure 1:
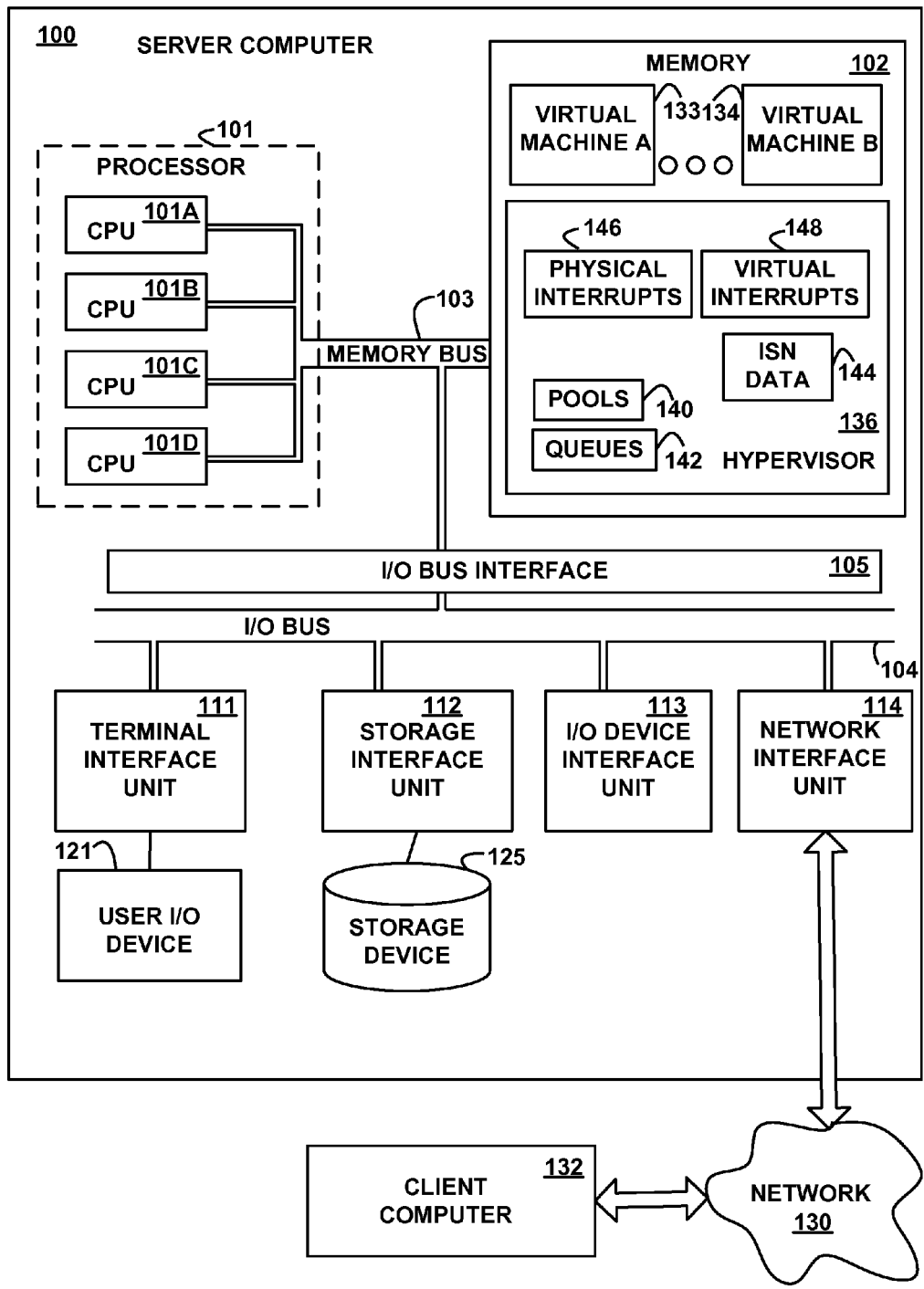
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to a client computer system 132 via a network 130, according to an embodiment of the present invention. The terms "server" and "client" are used herein for convenience only, and in various embodiments a computer system that operates as a client computer in one environment may operate as a server computer in another environment, and vice versa. The mechanisms and apparatus of embodiments of the present invention apply equally to any appropriate computing system.

The major components of the server computer system 100 comprise one or more processors 101, memory 102, a terminal interface unit 111, a storage interface unit 112, an I/O (Input/Output) device interface unit 113, and a network interface unit 114, all of which are communicatively coupled, directly or indirectly, for inter-component communication via a memory bus 103, an I/O bus 104, and an I/O bus interface unit 105.

The computer system 100 comprises one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the memory 102 and may comprise one or more levels of on-board cache.

In an embodiment, the memory 102 may comprise a random-access semiconductor memory, storage device, or storage medium for storing or encoding data and programs. In another embodiment, the memory 102 represents the entire virtual memory of the computer system 100, and may also include the virtual memory of other computer systems coupled to the computer system 100 or connected via the network 130. The memory 102 is conceptually a single monolithic entity, but in other embodiments the memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 is illustrated as containing the primary components utilized in implementing a virtual machine computing environment on the computer 100, including a plurality of virtual machines 133 and 134 managed by a hypervisor 136, pools 140, queues 142, ISN (Interrupt Source Number) data 144, physical interrupts 146, and virtual interrupts 148. Although the plurality of virtual machines 133 and 134, the hypervisor 136, the pools 140, the queues 142, the interrupt source number data 144, the physical interrupts 146, and the virtual interrupts 148 are illustrated as being contained within the memory 102 in the computer system 100, in other embodiments some or all of them may be on different computer systems, e.g., the client computer system 132, and may be accessed remotely, e.g., via the network 130. Further, the computer system 100 may use virtual addressing mechanisms that allow the programs of the computer system 100 to behave as if they only have access to a large, single storage entity instead of access to multiple, smaller storage entities. Thus, while the plurality of virtual machines 133 and 134, the hypervisor 136, the pools 140, the queues 142, the interrupt source number data 144, the physical interrupts 146, and the virtual interrupts 148 are illustrated as residing in the memory 102, these elements are not necessarily all completely contained in the same storage device at the same time.

Each of the plurality of virtual machines 133 and 134 may comprise and utilize an OS (operating system), which controls the primary operations of the virtual machines 133 and 134, in the same manner as the operating system of a non-partitioned computer. Some or all of the operating systems may be the same or different from each other. Each of the plurality of virtual machines 133 and 134 may further comprise programs or applications, which may be the same or different from each other. Any number of virtual machines 133 and 134 may be supported, and the number of the virtual machines 133 and 134 resident at any one time in the server computer 100 may change dynamically as virtual machines are added to or removed from the computer 100.

Each of the virtual machines 133 and 134 comprises instructions that execute on the processor 101 (to perform the functions as further described below with reference to FIGS. 2, 3, 4, 5, 6, and 7) in a separate, or independent, memory space, and thus each virtual machine 133 and 134 acts much the same as an independent, non-partitioned computer from the perspective of each application that executes in each such virtual machine. As such, the applications typically do not require any special configuration for use in a virtual machine environment. In various embodiments, the applications that execute within the virtual machines 133 or 134 may be user applications, third-party applications, or any portion, multiple, or combination thereof.

Although the hypervisor 136 is illustrated as being within the memory 102, in other embodiments, all or a portion of the hypervisor 136 may be implemented in firmware or hardware. The hypervisor 136 may perform both low-level partition management functions, such as page table management and may also perform higher-level partition management functions, such as creating and deleting the virtual machines 133 and 134, concurrent I/O maintenance, and allocating/deallocating processors, memory and other hardware or program resources to/from the various virtual machines 133 and 134.

In an embodiment, the hypervisor 136 comprises instructions that execute on the processor 101 or statements that are interpreted by instructions executing on the processor 101 to perform the functions as further described below with reference to FIGS. 2, 3, 4, 5, 6, and 7. In another embodiment, the hypervisor 136 may be implemented in microcode or firmware. In another embodiment, the hypervisor 136 may be implemented in hardware via logic gates and/or other appropriate hardware techniques. The hypervisor 136 further comprises pools 140, queues 142, interrupt source number data 144, physical interrupts 146, and virtual interrupts 148, but in other embodiments, the pools 140, the queues 142, the interrupt source number data 144, the physical interrupts 146, and the virtual interrupts 148 are stored separately from the hypervisor 136.

The hypervisor 136 statically and/or dynamically allocates to each logical partition 134 a portion of the available resources in the computer 100. For example, each virtual machine 133 and 134 may be allocated one or more of the processors 101 and/or one or more hardware threads on which to execute, as well as a portion of the available memory 102 to access. The virtual machines 133 and 134 may share specific program and/or hardware resources, such as the processors 101, such that a given resource may be utilized by more than one virtual machine 133 or 134. In the alternative, program and hardware resources may be allocated to only one virtual machine at a time. Additional resources, e.g., mass storage, backup storage, user input, network connections, and the I/O adapters therefor, are typically allocated to one or more of the virtual machines 133 and 134. Resources may be allocated in a number of manners, e.g., on a bus-by-bus basis, or on a resource-by-resource basis, with multiple logical virtual machines 133 and 134 sharing resources on the same bus. Some resources may be allocated to multiple logical virtual machines 133 and 134 at a time. The resources identified herein are examples only, and any appropriate hardware and/or program resource of the server computer system 100, the client computer system 132 and/or the network 130 that is capable of being allocated on a shared or sole basis to the virtual machines 133 and/or 134 may be used.

The queues 142 store requests sent from the virtual machines 133 and 134. In various embodiments, the requests may be read requests, write requests, update requests, requests to send or receive data, requests to perform operations on data, such as compression, decompression, encryption, decryption, verification, validation, rendering, formatting, displaying, printing, or any other type of request.

In an embodiment, the physical interrupts 146 are completion interrupts, which specify that a hardware resource has completed the processing of a request. In an embodiment, the physical interrupts 146 may comprise a physical interrupt source number that is assigned to and that uniquely identifies the hardware resource (among all hardware resources connected to the same bus) that sends or raises the physical interrupt. The virtual interrupts 148 may comprise a virtual interrupt source number that is assigned to a virtual machine 133 or 134 that sends requests. Virtual interrupt source numbers are unique within a virtual machine 133 or 134 but are not necessarily unique across all virtual machines 133 and 134. The pools 140 store sets of virtual interrupt source numbers that are assigned to the virtual machines 133 or 134.

The memory bus 103 provides a data communication path for transferring data among the processor 101, the memory 102, and the I/O bus interface unit 105. The I/O bus interface unit 105 is further coupled to the system I/O bus 104 for transferring data to and from the various I/O interface units. The I/O bus interface unit 105 communicates with multiple I/O interface units 111, 112, 113, and 114, which are also known as I/O processors (IOPs) or I/O adapters (IOAs), through the I/O bus 104.

The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the computer system 100, and may receive output data via the user output devices. For example, a user interface may be presented via the user I/O device 121, such as displayed on a display device, played via a speaker, or printed via a printer.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the memory 102, or any portion thereof, may be stored to and retrieved from the storage device 125, as needed. The I/O device interface 113 provides an interface to any of various other input/output devices or devices of other types, such as printers or fax machines. The network interface unit 114 provides one or more communications paths from the computer system 100 to other digital devices and computer systems 132; such paths may comprise, e.g., one or more networks 130.

Although the memory bus 103 is shown in FIG. 1 as a relatively simple, single bus structure providing a direct communication path among the processors 101, the memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the computer system 100 and the client computer system 132. In various embodiments, the network 130 may represent a storage device or a combination of storage devices, either connected directly or indirectly to the computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented as an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

The client computer system 132 may comprise any, some, or all of the hardware and/or computer program elements of the computer system 100.

FIG. 1 is intended to depict the representative major components of the server computer system 100, the network 130, and the client computer system 132. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the computer system 100 and that, when read and executed by one or more processors in the computer system 100 or when interpreted by instructions that are executed by one or more processors, cause the computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function (s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
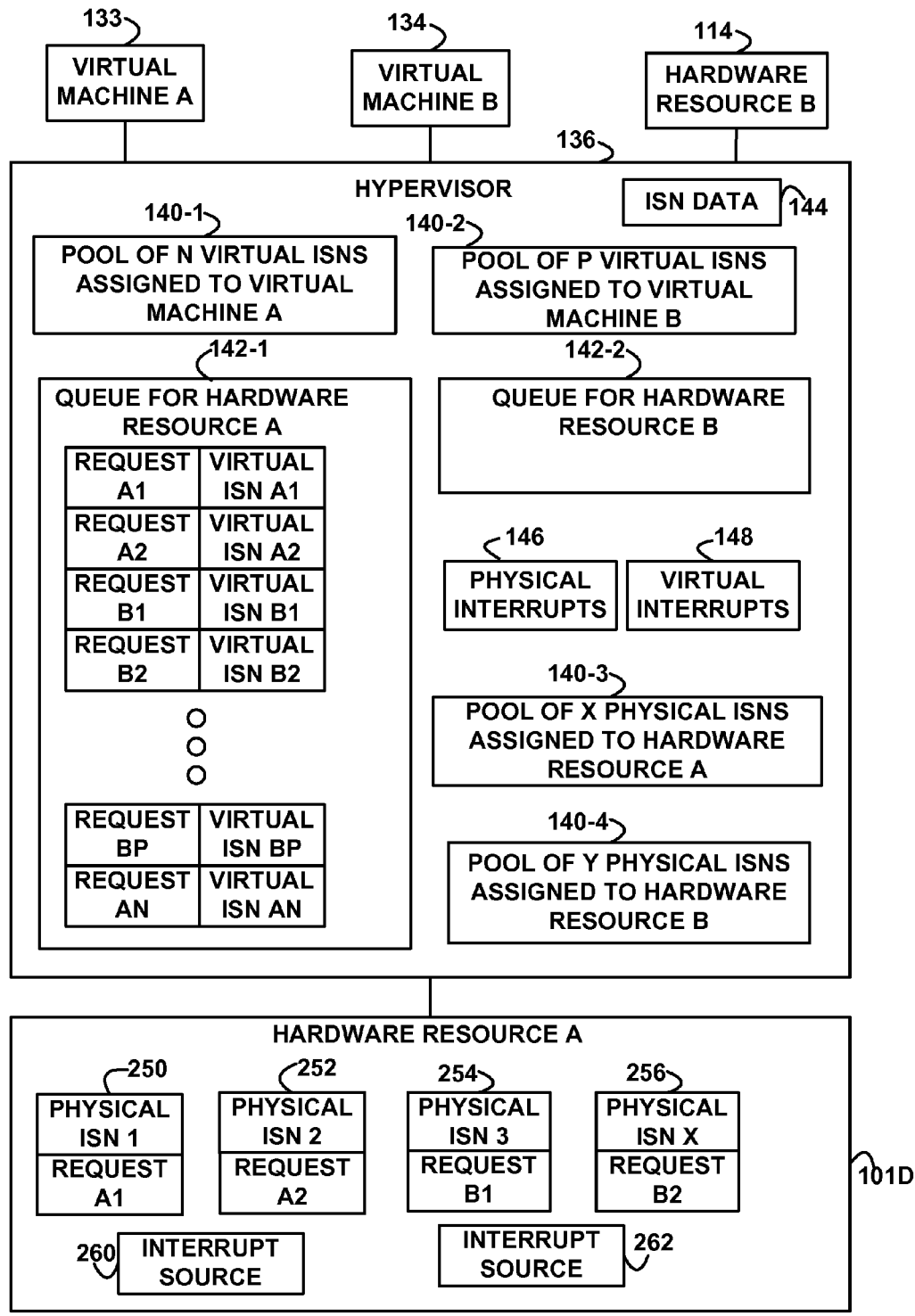
FIG. 2 depicts a block diagram of the interaction of selected components of a computer system, according to an embodiment of the invention.

FIG. 2 depicts a block diagram of the interaction of selected components of a computer system, according to an embodiment of the invention, such as the virtual machine A 133, the virtual machine B 134, the hypervisor 136, the hardware resource A (an example of which is the CPU 101D), and the hardware resource B (an example of which is the network interface unit 114).

The hypervisor 136 comprises a queue 142-1, which is assigned to the hardware resource A 101D, and a queue 142-2, which is assigned to the hardware resource B 114. The queues 142-1 and 142-2 are examples of, and are generically referred to by, the queues 142 (FIG. 1). The queue 142-1 comprises requests that the hypervisor 136 received from the virtual machines 133 and/or 134, but has not yet sent to the hardware resource A 101D. For example, the queue 142 comprises a request A1 (received from the virtual machine A 133) assigned a virtual interrupt source number $A_1$, a request A2 (received from the virtual machine A 133) assigned a virtual interrupt source number $A_2$, a request B1 (received from the virtual machine B 134) assigned a virtual interrupt source number $B_1$, a request B2 (received from the virtual machine B 134) assigned a virtual interrupt source number $B_2$, a request BP (received from the virtual machine B 134) assigned a virtual interrupt source number $B_P$, and a request AN (received from the virtual machine A 133) assigned a virtual interrupt source number $A_N$. Thus, the queue 142-1 comprises N requests received from the virtual machine A 133 and P requests received from the virtual machine B 134.

The hypervisor 136 further comprises a pool 140-1 of N virtual interrupt source numbers assigned to the virtual machine A 133 and a pool 140-2 of P virtual interrupt source numbers assigned to the virtual machine B 134. N+P is the maximum number of requests that the queue 142-1 may store at any one time and also the maximum number of requests that the queue 142-2 may store at any one time. The hypervisor 136 further comprises a pool 140-3 of X physical interrupt source numbers assigned to the hardware resource A 101D. The hypervisor 136 further comprises a pool 140-4 of Y physical interrupt source numbers assigned the hardware resource B 114. The pools 140-1, 140-2, 140-3, and 140-4 are examples of, and are generically referred to by, the pools 140 (FIG. 1). The queue 142-2 comprises requests that the hypervisor 136 has received from the virtual machine 133 and/or 134, but has not yet sent to the shared hardware resource B (the network interface unit 114). In various embodiments, N>X, P>X, or N+P>X. That is, in various embodiments, the number of virtual interrupt source numbers assigned to each of the virtual machines 133 or 134 may be larger than the number of physical interrupt source numbers assigned to any one hardware resource (e.g., the hardware resource 101D or 114), or the number of virtual interrupt source numbers assigned to all virtual machines 133 and 134 may be larger than the number of physical interrupt source numbers assigned to any one hardware resource (e.g., the hardware resource 101D or 114).

The hardware resource A 101D receives requests from the hypervisor 136 and performs, executes, or carries out the requests, such as the requests A1, A2, B1, and B2, which are assigned respective physical interrupt source numbers ISN 1 250, ISN 2 252, ISN 3 254, and ISN X 256. The hardware resource A 101D comprises interrupt sources, such as the interrupt sources 260 and 262. In various embodiments, the interrupt source 260 or 262 may be the entire hardware resource A 101D or may be an element (a module, a circuit, a function, or an operation) within the hardware resource A 101D that raises or sends physical interrupts that specify the physical interrupt source number on the bus (such as the memory bus 103 or the I/O bus 104), to which the hardware resource attaches. The hypervisor 136 receives the raised physical interrupts from the hardware resource A 101D and stores them as the physical interrupts 146. In an embodiment, the physical interrupts 146 are completion interrupts, indicating that the request processed by the hardware resource is complete, but in other embodiments any appropriate interrupt may be used such as an error interrupt or an interrupt that requests a DMA (direct memory access) data transfer. In response to receiving the physical interrupts 146, the hypervisor 136 determines the virtual interrupt source number assigned to the physical interrupt source number specified by the physical interrupt 146 and sends the virtual interrupt 148 that specifies the determined virtual interrupt source number to the virtual machine that sent the request to the hypervisor 136.

FIG. 3 depicts a block diagram of ISN (interrupt source number) data 144, according to an embodiment of the invention. The interrupt source number data 144 comprises example entries 302, 304, 306, 308, and 310, each of which comprises an example virtual machine identifier (ID) field 320, a virtual ISN (interrupt source number) field 322, a physical ISN (interrupt source number) field 324.

The virtual machine identifier field 320, in each entry, uniquely identifies one of the virtual machines 133 or 134. The virtual interrupt source number field 322, in each entry, specifies a virtual interrupt source number assigned to a request that the virtual machine 133 or 134 identified in the virtual machine identifier field 320, in the same entry, previously sent to the hypervisor 136. The physical interrupt source number field 324, in each entry specifies a physical interrupt source number assigned to the virtual interrupt source number 322 and the virtual machine identifier 320, in the same entry.

Physical interrupt source numbers are unique across all hardware resources that attach to the same bus (such as the memory bus 103 or the I/O bus 104) in the computer system 100 and uniquely identify an interrupt source, such as the interrupt source 260 or 262. Different requests may specify the same physical interrupt source number at different times, but different requests that specify the same physical interrupt source number may not be present in the hardware resource simultaneously. In response to receiving a physical interrupt, the processor 101 interrupts the executing program and gives control to an interrupt handler, which in an embodiment is identified by the physical interrupt source number.

Virtual interrupt source numbers are unique within a virtual machine 133 or 134, but are not necessarily unique across all virtual machines 133 and 134 (e.g., both the virtual machine A and the virtual machine B use the virtual interrupt source number 322 of "2," as specified in the entry 302 and the entry 308). In various embodiments, virtual interrupt source numbers identify a method, a procedure, a subprocedure, a routine, an operation, or a function within a virtual machine 133 or 134 that is invoked as a result of, and in response to, an interrupt, message, notification or response from a hardware resource, or that handles or responds to interrupts, messages, notifications or responses from a hardware resource, or that sends requests to the hardware resource. In an embodiment, the virtual interrupt source number uniquely identifies the request.

In various embodiments, the interrupt source number data 144 may be implemented as a table, a tree, a database, or any other data structure. In another embodiment, the interrupt source number data 144 is represented programmatically in the hypervisor 136.

Figure 4:
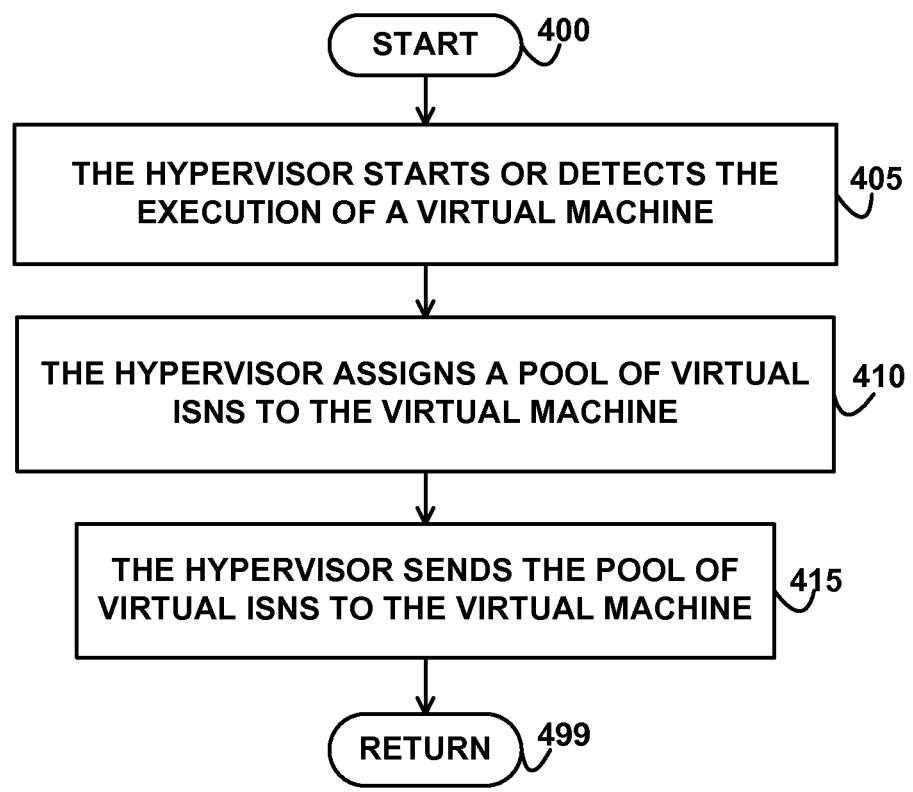
FIG. 4 depicts a flowchart of example processing for assigning interrupt source numbers to virtual machines, according to an embodiment of the invention.

FIG. 4 depicts a flowchart of example processing for assigning interrupt source numbers to virtual machines, according to an embodiment of the invention. Control begins at block 400. Control then continues to block 405 where the hypervisor 136 starts or detects the execution of a virtual machine 133 or 134 at the computer 100. Control then continues to block 410 where the hypervisor 136 assigns a pool 140-1 or 140-2 of virtual interrupt source numbers to the started or detected virtual machine 133 or 134. In various embodiments, the hypervisor 136 allocates virtual interrupt source numbers equally among all virtual machines 133 or 134, allocates virtual interrupt source numbers to the virtual machine 133 or 134 in proportion to the number of requests that the virtual machine 133 or 134 submitted in an historical time period, or allocates the virtual interrupt source numbers in proportion to the performance of requests that the hypervisor 136 received from the virtual machine 133 or 134 in an historical time period. Control then continues to block 415 where the hypervisor 136 sends the pool 140-1 or 140-2 of virtual interrupt source numbers to the detected or started virtual machine 133 or 134. Control then continues to block 499 where the logic of FIG. 4 returns.

Figure 5:
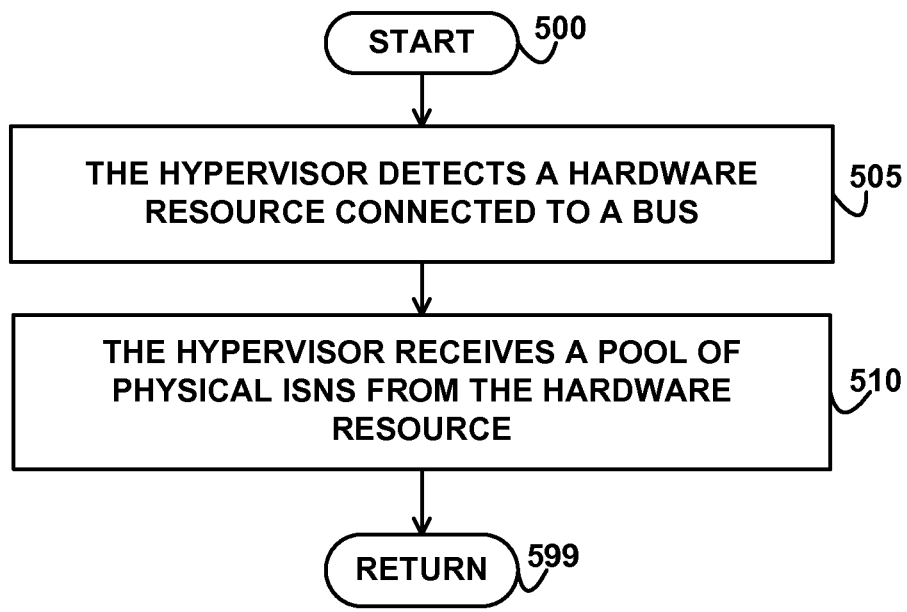
FIG. 5 depicts a flowchart of example processing for assigning physical interrupt source numbers to resources, according to an embodiment of the invention.

FIG. 5 depicts a flowchart of example processing for assigning physical interrupt source numbers to hardware resources, according to an embodiment of the invention. Control begins at block 500. Control then continues to block 505 where the hypervisor 136 detects a hardware resource connected to a bus, such as the memory bus 103 or the I/O bus 104. Control then continues to block 510 where the hypervisor 136 receives a pool of physical interrupt source numbers from the hardware resource that are uniquely assigned to that hardware resource and stores the received pool to the pool 140-3 or 140-4. Control then continues to block 599 where the logic of FIG. 5 returns.

Figure 6:
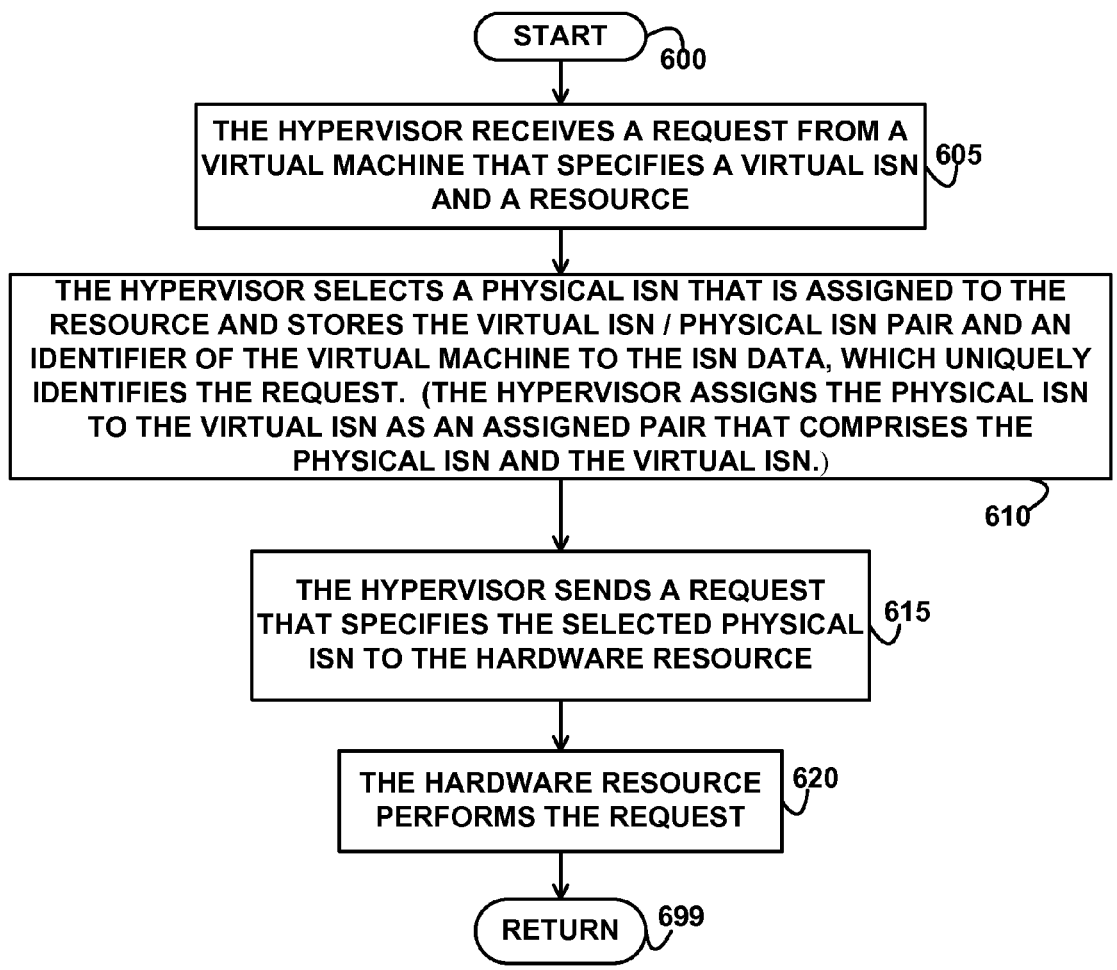
FIG. 6 depicts a flowchart of example processing for sending requests to hardware resources, according to an embodiment of the invention.

FIG. 6 depicts a flowchart of example processing for sending requests to hardware resources, according to an embodiment of the invention. Control begins at block 600. Control then continues to block 605 where the hypervisor 136 receives a request from a virtual machine 133 or 134 that specifies a virtual interrupt source number and an identifier of a hardware resource. Control then continues to block 610 where the hypervisor 136 selects a physical interrupt source number that is assigned to the hardware resource and stores the virtual interrupt source number/physical interrupt source number pair and an identifier of the virtual machine that sent the request to an entry in the interrupt source number data 144. That is, the hypervisor 136 assigns the physical interrupt source number to the virtual interrupt source number as an assigned pair that comprises the physical interrupt source number and the virtual interrupt source number. In an embodiment, if the hardware resource has more than one assigned physical interrupt source number in its pool 140-3 or 140-4, the hypervisor 136 selects an unused physical interrupt source number (a physical interrupt source number that does not exist in any entry in the interrupt source number data 144) at random. Control then continues to block 615 where the hypervisor 136 sends a request that specifies the selected physical interrupt source number to the hardware resource. In an embodiment, the hypervisor 136 may store the request on the queue 142-1 or 142-2 assigned to the hardware resource prior to sending the request to the hardware resource (e.g., if the hardware resource has no current capacity available to accept another request or is otherwise busy or unavailable) or may send the request to the hardware resource without storing the request on a queue (e.g., if the hardware resource has current capacity available to accept the request). Control then continues to block 620 where the hardware resource performs the request. Control then continues to block 699 where the logic of FIG. 6 returns.

Figure 7:
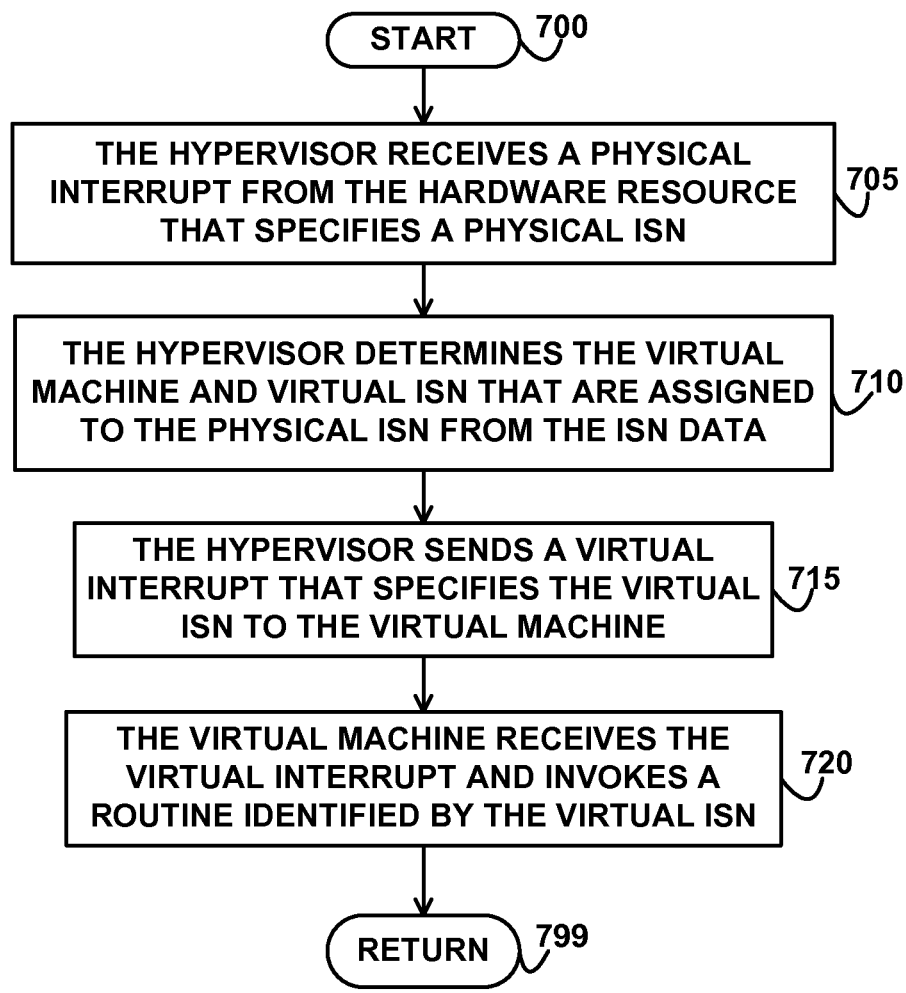
FIG. 7 depicts a flowchart of example processing for responding to physical interrupts, according to an embodiment of the invention.

FIG. 7 depicts a flowchart of example processing for responding to physical interrupts, according to an embodiment of the invention. Control begins at block 700. Control then continues to block 705 where the hypervisor 136 receives a physical interrupt from the hardware resource that specifies a physical interrupt source number. In an embodiment, the physical interrupt is a completion interrupt, which indicates that the hardware resources has finished processing a request. Control then continues to block 710 where the hypervisor 136 determines the virtual machine and virtual interrupt source number that are assigned to the physical interrupt source number from the interrupt source number data 144, by searching for and finding an entry in the interrupt source number data 144 with a physical interrupt source number field 324 that matches the received physical interrupt source number and reading the virtual machine identifier 320 and virtual interrupt source number 322 from the same entry.

Control then continues to block 715 where the hypervisor 136 sends a virtual interrupt that specifies the determined virtual interrupt source number to the determined virtual machine. In an embodiment, the hypervisor 136 uses an interprocessor interrupt (IPI) to interrupt the processor 101 and then deliver the virtual interrupt 148 to the virtual machine 133 or 134, in response to a call by the virtual machine 133 or 134 to the hypervisor 136 to determine the reason for the IPI. Thus, although the processor 101 has no knowledge of the virtual interrupt source numbers, the virtual interrupt 148 results in the processor 101 being interrupted.

Control then continues to block 720 where the virtual machine 133 or 134 receives the virtual interrupt and invokes a routine identified by the virtual interrupt source number, which processes the virtual interrupt. Control then continues to block 799 where the logic of FIG. 7 returns.

In various embodiments, the logic of FIGS. 4, 5, 6, and 7 may execute simultaneously, concurrently, substantially concurrently, or interleaved on the same or different of the processors 101 or the same or different of the CPUs 101A, 101B, 101C, and 101D via multi-threading, multi-programming, or multi-processing techniques. Further, the logic of FIGS. 4, 5, 6, and 7 may be executed multiple times while processing different conditions, interrupts, and/or requests.

In this way, in an embodiment, virtual machines 133 or 134 may send more concurrent requests with more virtual source numbers than the shared hardware resources that process the requests are capable of supporting, which increases the performance of the virtual machines 133 or 134.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. For example, tables, databases, or trees may be used as alternative organizations of data. In addition, any data may be combined with logic, so that a data structure separate from logic is not necessary. The previous detailed description is, therefore, not to be taken in a limiting sense.

What is claimed is:

1. A method comprising:
    receiving a request from a virtual machine that specifies a first virtual interrupt source number and a first hardware resource;
    selecting a first physical interrupt source number that is assigned to the first hardware resource;
    assigning the first physical interrupt source number to the first virtual interrupt source number as an assigned pair that comprises the first physical interrupt source number and the first virtual interrupt source number;
    saving the assigned pair;
    sending the request and the first physical interrupt source number to the first hardware resource;
    receiving a physical interrupt from the first hardware resource that specifies the first physical interrupt source number;
    in response to the receiving the physical interrupt that specifies the first physical interrupt source number, determining the virtual machine and the first virtual interrupt source number that is assigned to the first physical interrupt source number from the physical interrupt and the assigned pair, wherein the determining the virtual machine determines the virtual machine from among a plurality of virtual machines; and
    in response to the determining the virtual machine and the first virtual interrupt source number that is assigned to the first physical interrupt source number, sending a virtual interrupt that comprises that first virtual interrupt source number to the virtual machine.

2. The method of claim 1, wherein the first hardware resource performs the request.

3. The method of claim 2, further comprising:
    assigning a plurality of virtual interrupt source numbers to the virtual machine, wherein the first virtual interrupt source number is one of the plurality of virtual interrupt source numbers.

4. The method of claim 3, wherein each of the plurality of virtual interrupt source numbers is unique within the virtual machine, but each of the plurality of virtual interrupt source numbers are not unique among the plurality of virtual machines.

5. The method of claim 1, further comprising:
    receiving a plurality of physical interrupt source numbers from the first hardware resource, wherein the plurality of physical interrupt source numbers are unique to the first hardware resource among all of a plurality of hardware resources that are connected to a same bus.

6. The method of claim 5, wherein the first physical interrupt source number is one of the plurality of physical interrupt source numbers, and wherein a number of the plurality of virtual interrupt source numbers is greater than a number of the plurality of physical interrupt source numbers.

7. The method of claim 6, wherein the selecting the first physical interrupt source number that is assigned to the first hardware resource further comprises:
    selecting the first physical interrupt source number that is assigned to the first hardware resource from among the plurality of physical interrupt source numbers received from the first resource.

8. The method of claim 1, wherein the virtual machine invokes a routine identified by the virtual interrupt source number in response to receiving the virtual interrupt.

9. A non-transitory computer-readable storage medium encoded with instructions, wherein the instructions when executed comprise:
    receiving a request from a virtual machine that specifies a first virtual interrupt source number and a first hardware resource;
    selecting a first physical interrupt source number that is assigned to the first hardware resource;
    assigning the first physical interrupt source number to the first virtual interrupt source number as an assigned pair that comprises the first physical interrupt source number and the first virtual interrupt source number;
    saving the assigned pair;
    sending the request and the first physical interrupt source number to the first hardware resource, wherein the first hardware resource performs the request;
    receiving a physical interrupt from the first hardware resource that specifies the first physical interrupt source number;
    in response to the receiving the physical interrupt that specifies the first physical interrupt source number, determining the virtual machine and the first virtual interrupt source number that is assigned to the first physical interrupt source number from the physical interrupt and the assigned pair, wherein the determining the virtual machine determines the virtual machine from among a plurality of virtual machines; and
    in response to the determining the virtual machine and the first virtual interrupt source number that is assigned to the first physical interrupt source number, sending a virtual interrupt that comprises that first virtual interrupt source number to the virtual machine, wherein the virtual machine invokes a routine identified by the virtual interrupt source number in response to receiving the virtual interrupt.

10. The non-transitory computer-readable storage medium of claim 9, further comprising:
    assigning a plurality of virtual interrupt source numbers to the virtual machine, wherein the first virtual interrupt source number is one of the plurality of virtual interrupt source numbers.

11. The non-transitory computer-readable storage medium of claim 10, wherein each of the plurality of virtual interrupt source numbers is unique within the virtual machine, but each of the plurality of virtual interrupt source numbers are not unique among the plurality of virtual machines.

12. The non-transitory computer-readable storage medium of claim 9, further comprising:
    receiving a plurality of physical interrupt source numbers from the first hardware resource, wherein the plurality of physical interrupt source numbers are unique to the first hardware resource among all of a plurality of hardware resources that are connected to a same bus.

13. The non-transitory computer-readable storage medium of claim 12, wherein the first physical interrupt source number is one of the plurality of physical interrupt source numbers, and wherein a number of the plurality of virtual interrupt source numbers is greater than a number of the plurality of physical interrupt source numbers.

14. The non-transitory computer-readable storage medium of claim 13, wherein the selecting the first physical interrupt source number that is assigned to the first hardware resource further comprises:
  selecting the first physical interrupt source number that is assigned to the first hardware resource from among the plurality of physical interrupt source numbers received from the first resource.

15. A computer comprising:
  a processor;
  a hardware resource; and
  memory communicatively coupled to the processor and the hardware resource, wherein the memory is encoded with instructions, and wherein the instructions when executed on the processor comprise
    receiving a request from a virtual machine that specifies a first virtual interrupt source number and a first hardware resource,
    selecting a first physical interrupt source number that is assigned to the first hardware resource,
    assigning the first physical interrupt source number to the first virtual interrupt source number as an assigned pair that comprises the first physical interrupt source number and the first virtual interrupt source number,
    saving the assigned pair,
    sending the request and the first physical interrupt source number to the first hardware resource, wherein the first hardware resource performs the request,
    receiving a physical interrupt from the first hardware resource that specifies the first physical interrupt source number,
    in response to the receiving the physical interrupt that specifies the first physical interrupt source number, determining the virtual machine and the first virtual interrupt source number that is assigned to the first physical interrupt source number from the physical interrupt and the assigned pair, wherein the determining the virtual machine determines the virtual machine from among a plurality of virtual machines, and
    in response to the determining the virtual machine and the first virtual interrupt source number that is assigned to the first physical interrupt source number, sending a virtual interrupt that comprises that first virtual interrupt source number to the virtual machine, wherein the virtual machine invokes a routine identified by the virtual interrupt source number in response to receiving the virtual interrupt.

16. The computer of claim 15, wherein the instructions further comprise:
  assigning a plurality of virtual interrupt source numbers to the virtual machine, wherein the first virtual interrupt source number is one of the plurality of virtual interrupt source numbers.

17. The computer of claim 16, wherein each of the plurality of virtual interrupt source numbers is unique within the virtual machine, but each of the plurality of virtual interrupt source numbers are not unique among the plurality of virtual machines.

18. The computer of claim 15, wherein the instructions further comprise:
  receiving a plurality of physical interrupt source numbers from the first hardware resource, wherein the plurality of physical interrupt source numbers are unique to the first hardware resource among all of a plurality of hardware resources that are connected to a same bus.

19. The computer of claim 18, wherein the first physical interrupt source number is one of the plurality of physical interrupt source numbers, and wherein a number of the plurality of virtual interrupt source numbers is greater than a number of the plurality of physical interrupt source numbers.

20. The computer of claim 19, wherein the selecting the first physical interrupt source number that is assigned to the first hardware resource further comprises:
  selecting the first physical interrupt source number that is assigned to the first hardware resource from among the plurality of physical interrupt source numbers received from the first resource.

* * * * *